United States Patent
Fukui

(10) Patent No.: US 7,327,712 B2
(45) Date of Patent: Feb. 5, 2008

(54) SELECTION SYSTEM, ITS SELECTION METHOD FOR VOICE CHANNELS, AND SWITCHBOARD FOR USE THEREIN

(75) Inventor: Keiji Fukui, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 905 days.

(21) Appl. No.: 10/185,001

(22) Filed: Jul. 1, 2002

(65) Prior Publication Data
US 2003/0002487 A1 Jan. 2, 2003

(30) Foreign Application Priority Data
Jun. 29, 2001 (JP) .............................. 2001-199547

(51) Int. Cl.
*H04Q 7/28* (2006.01)
*H04L 12/66* (2006.01)
*H04L 12/28* (2006.01)
*H04M 11/00* (2006.01)
*H04M 1/24* (2006.01)

(52) U.S. Cl. ...................... 370/340; 370/327; 370/352; 370/389; 379/32.02; 379/39.14

(58) Field of Classification Search ........... 379/209.01, 379/112.04, 221.03, 207.02, 220.01, 221.07, 379/32.02, 93.14; 370/392, 396, 389, 352, 370/340
See application file for complete search history.

(56) References Cited

U.S. PATENT DOCUMENTS

| | | | | |
|---|---|---|---|---|
| 5,991,387 A * | 11/1999 | Shaffer et al. | ......... | 379/211.02 |
| 6,314,112 B1 * | 11/2001 | Hsu et al. | .................... | 370/477 |
| 6,405,053 B1 * | 6/2002 | McGuire | .................... | 455/522 |
| 6,519,257 B1 * | 2/2003 | Brueckheimer et al. | . | 370/395.2 |
| 6,914,900 B1 * | 7/2005 | Komatsu et al. | ............ | 370/356 |
| 6,987,848 B1 * | 1/2006 | Choudhury et al. | ... | 379/209.01 |
| 7,006,489 B2 * | 2/2006 | Li et al. | .................... | 370/352 |
| 7,065,203 B1 * | 6/2006 | Huart et al. | ........... | 379/266.06 |
| 7,181,401 B2 * | 2/2007 | Johnson et al. | ............. | 704/277 |

* cited by examiner

*Primary Examiner*—Hanh Nguyen
(74) *Attorney, Agent, or Firm*—Young & Thompson

(57) ABSTRACT

A voice channel selection system for use in VoIP communication includes a plurality of VoIP trunk packages and a switchboard for bidirectional connection to the Internet via this plurality of VoIP trunk packages. The switchboard is provided with a call control unit. The plurality of VoIP trunk packages are respectively provided with voice signal processing units for processing voice signals and control signal processing units for processing call control signals. When an unoccupied voice channel is present in the voice signal processing unit of the VoIP trunk package, the call control unit of the switchboard forms voice communication paths on the basis of call control signals received by the control signal processing units.

18 Claims, 7 Drawing Sheets

Fig. 3

| MOUNTING POSITION | PKG NUMBER |
|---|---|
| A | 1 |
| B | 2 |
| ⋮ | ⋮ |

| GROUP NUMBER | PKG NUMBER |
|---|---|
| 10 | 1 |
| | 2 |
| | 3 |
| | ⋮ |
| | 6 |
| 20 | 7 |
| | 8 |
| | 9 |
| | ⋮ |
| ⋮ | ⋮ |

| GROUP NUMBER | CHANNEL NUMBER |
|---|---|
| 10 | 1 |
|  | 2 |
|  | 3 |
|  | ⋮ |
|  | 20 |
| 20 | 21 |
|  | 22 |
|  | 23 |
|  | ⋮ |
| ⋮ | ⋮ |

| CHANNEL NUMBER | STATE |
|---|---|
| 1 | OCCUPIED |
| 2 | OCCUPIED |
| 3 | OCCUPIED |
| ⋮ | ⋮ |
| 5 | OCCUPIED |
| 6 | OCCUPIED |
| 7 | UNOCCUPIED |
| 8 | UNOCCUPIED |
| ⋮ | ⋮ |
| 10 | UNOCCUPIED |
| 11 | OCCUPIED |
| ⋮ | ⋮ |
| 20 | OCCUPIED |
| ⋮ | ⋮ |

| PKG NUMBER | CHANNEL NUMBER | IP ADDRESS | PORT NUMBER |
|---|---|---|---|
| 1 | 1 | 1. 1. 1. 1 | 1000 |
|   | 2 |   | 1001 |
|   | 3 |   | 1002 |
|   | ⋮ |   | ⋮ |
|   | 5 |   | 1004 |
| 2 | 6 | 1. 1. 1. 2 | 1005 |
|   | 7 |   | 1006 |
|   | 8 |   | 1007 |
|   | ⋮ |   | ⋮ |
|   | 10 |   | 1009 |
| ⋮ | ⋮ | ⋮ | ⋮ |

Fig. 8

| CALL NUMBER | PKG NUMBER TO WHICH CONTROL SIGNAL PROCESSING UNIT IN USE BELONGS | PKG NUMBER TO WHICH VOICE SIGNAL PROCESSING UNIT IN USE BELONGS | VOICE CHANNEL NUMBER IN USE |
|---|---|---|---|
| 1 | 1 | 1 | 3 |
| 5 | 1 | 2 | 7 |
| 7 | 2 | 1 | 2 |
| ... | ... | ... | ... |

46

SELECTION SYSTEM, ITS SELECTION METHOD FOR VOICE CHANNELS, AND SWITCHBOARD FOR USE THEREIN

BACKGROUND OF THE INVENTION

1. Field of the Invention

The present invention relates to a selection system, its selection method for voice channels, and more particularly to a selection system, its selection method for voice channels for selecting an unoccupied voice channel within a VoIP-compatible trunk package and forming voice communication paths in a switchboard having a plurality of voice over IP (VoIP) trunks for connection to the Internet.

2. Description of the Related Art

It is known that a VoIP trunk package is mounted on a telephone switchboard for connection to the Internet. There is a hardware constraint to processing hundreds of voice channels by the use of a single large-scale VoIP trunk package. In order to avert such a hardware constraint and further to enhance safety by load decentralization, usually a VoIP trunk package is mounted in the order of a few dozens of channels.

In a switchboard on which a plurality of VoIP trunk packages are mounted, calls may sometimes concentrate on a specific VoIP trunk package to keep all the voice channels in the package busy. If call control information arrives from the Internet at the VoIP trunk package on the switchboard in this state, the switchboard is judged to be busy. Such a judgment gives rise to incomplete calls, which cannot arrive at their respective destinations. The switchboard, which is a collective body of the plurality of VoIP trunk packages, cannot effectively utilize any unoccupied channel that may be available in some other VoIP trunk package.

On the other hand, two trunks accommodated in a line circuit switching network instead of the Internet are opposite each other on a one-to-one basis, and line circuits are physically connected between them. Since the opposite trunks are aware of unoccupied voice channel resources on each other, no call is initiated to an interface having no unoccupied voice channel unless the same voice channel happens to be selected. Nor does any call arrive at an interface having no unoccupied voice channel.

However, on trunks in the Internet, opposite VoIP apparatuses in the Internet are connected in an unspecified way on a one-to-N basis, resulting in different circumstances from trunks in a line circuit switching network.

Thus, on account of this unspecified connection on the one-to-N basis, the VoIP apparatus initiating a call cannot know whether or not an unoccupied voice channel is available on the destination VoIP apparatus supposed to receive that call. Furthermore, the destination VoIP apparatus, since it cannot identify the opposite call-initiating VoIP apparatus, cannot notify the call-initiating VoIP apparatus of the availability or unavailability of any voice channel resource on the part of the destination VoIP apparatus.

Therefore, even if there is an unoccupied voice channel in one VoIP trunk package or another in the whole system consisting of a plurality of VoIP trunk packages and a switchboard, that unoccupied voice channel cannot be necessarily put to effective use.

SUMMARY OF THE INVENTION

An object of the present invention therefore is to provide a selection system, its selection method for voice channels permitting the use of voice channels unoccupied in one package or another where there is no unoccupied voice channel by having a plurality of VoIP packages complementarily utilize one another.

A voice channel selection system according to the invention is provided with a plurality of VoIP trunk packages and a switchboard for bidirectional connection to the Internet via a plurality of VoIP trunk packages. The switchboard is provided with a call control unit. Each VoIP trunk package is provided with a voice signal processing unit for processing voice signals and a control signal processing unit for processing call control signals. The voice signal processing unit and the control signal processing unit operate independent of each other. If the voice signal processing unit of a certain VoIP trunk package has any unoccupied voice channel, the control signal processing unit receives a call control signal. Further, the call control unit of the switchboard also receives the same call control signal from the control signal processing unit, and forms voice communication paths on the basis of that call control signal.

BRIEF DESCRIPTION OF THE DRAWINGS

The above-stated and other objects, features and advantages of the present invention will become more apparent from the following detailed description when taken in conjunction with the accompanying drawings wherein:

FIG. 3 illustrates the configuration of a table of matching between the mounting position of a package and the package number in the embodiment of the invention;

FIG. 4 illustrates the configuration of a table of matching between the group number and the package number in the embodiment of the invention;

FIG. 5 illustrates the configuration of a table of matching between the group number and the voice channel number in the embodiment of the invention;

FIG. 6 illustrates the configuration of a table of matching between the voice channel number and the voice channel state in the embodiment of the invention;

FIG. 7 illustrates the configuration of a table of matching among the package number, the voice channel number, the IP address of the package and the port number of the package in the embodiment of the invention;

FIG. 8 illustrates the configuration of a table of matching among the call number, the package number to which the control signal processing unit currently in use belongs, the package number to which the voice signal processing unit currently in use belongs and the voice channel number currently in use in the embodiment of the invention; and, FIG. 9 illustrates the configuration of a table of matching between the package number for receiving a call initiation number and the package number of the alternative destination in the embodiment of the invention.

DETAILED DESCRIPTION OF THE PREFERRED EMBODIMENT

The voice channel selection system and its selection method in a preferred mode of implementing the present invention will be described below with reference to FIG. 1 through FIG. 9.

Figure 1:
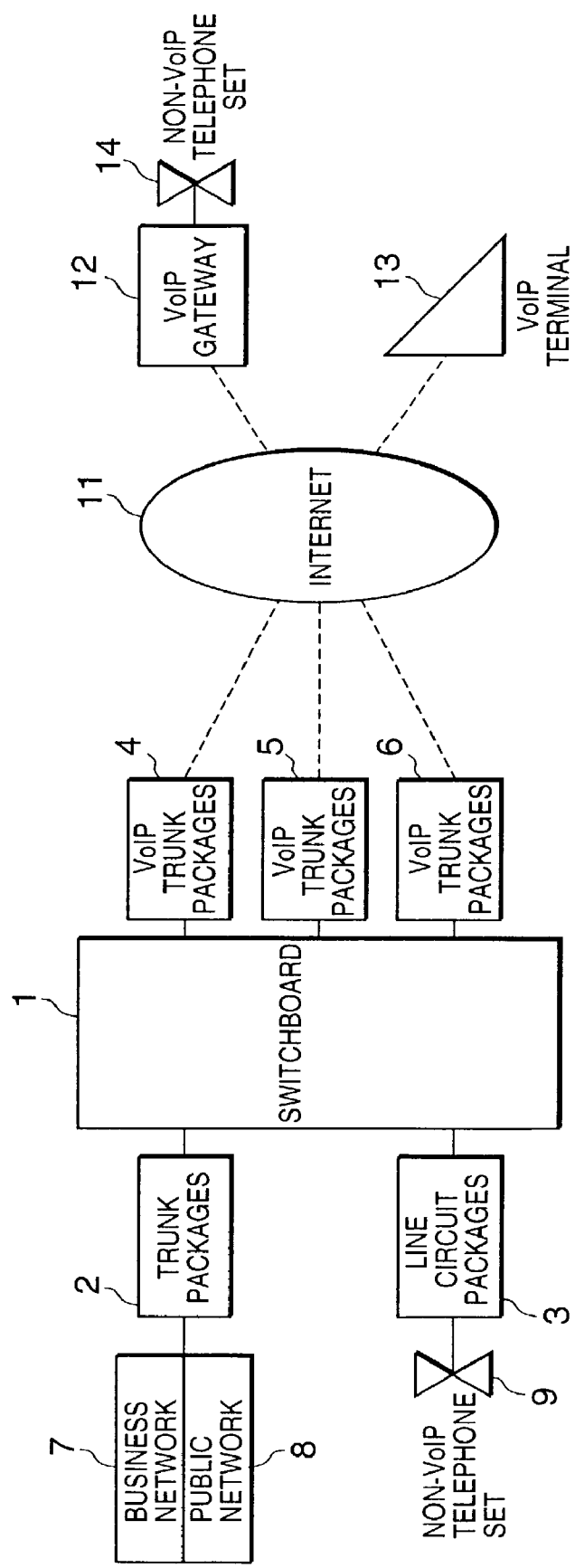
FIG. 1 illustrates the configuration of a voice channel selection system in a preferred embodiment of the invention.

FIG. 1 is a block diagram illustrating the configuration of the voice channel selection system in this mode of implementing the invention. A switchboard 1 is mounted with various trunk packages. Each trunk package 2 is connected to a business network 7 and a public network 8. A line circuit package 3 is connected to a non-VoIP telephone set 9. VoIP trunk packages 4, 5 and 6 can connect the business network 7, the public network 8 and telephone sets 9 to the Internet 11 via the switchboard 1.

The VoIP trunk package 4 will be hereinafter referred to as the first VoIP trunk package 4, and the VoIP trunk package 5, as the second VoIP trunk package 5, the latter representing all VoIP trunk packages differing from the first VoIP trunk package 4.

The Internet 11 is connected to a VoIP gateway 12 and a VoIP terminal 13. The VoIP gateway 12 is connected to a non-VoIP telephone set 14. The telephone set 14 can be connected to the Internet 11 via the VoIP gateway 12 to execute voice communication. The VoIP terminal 13 can be directly connected to the Internet 11 to execute voice communication.

Each of the VoIP trunk packages 4, 5 and 6, the VoIP gateway 12 and the VoIP terminal 13 is provided with one IP address, which is uniquely different from others, and is connected to the Internet 11.

Each of the plurality of VoIP trunk packages 4, 5 and 6 has a plurality of channels and executes voice signal processing and control signal processing. The VoIP gateway 12, the VoIP terminal 13 and the VoIP trunk packages 4, 5 and 6, capable of converting voice into an IP packet and vice versa, can communicate voice messages converted into an IP packet over the Internet 11.

The switchboard 1, by using the VoIP trunk packages 4, 5 and 6, connect the business network 7, the public network 8 and non-VoIP telephone sets 9 to the VoIP gateway 12 and the VoIP terminal 13 on the Internet 11. These connections enable each of the business network 7, the public network 8 and telephone sets 9 to perform two-way voice communication with telephone sets 14 and the VoIP terminal 13 via the Internet 11.

Figure 2:
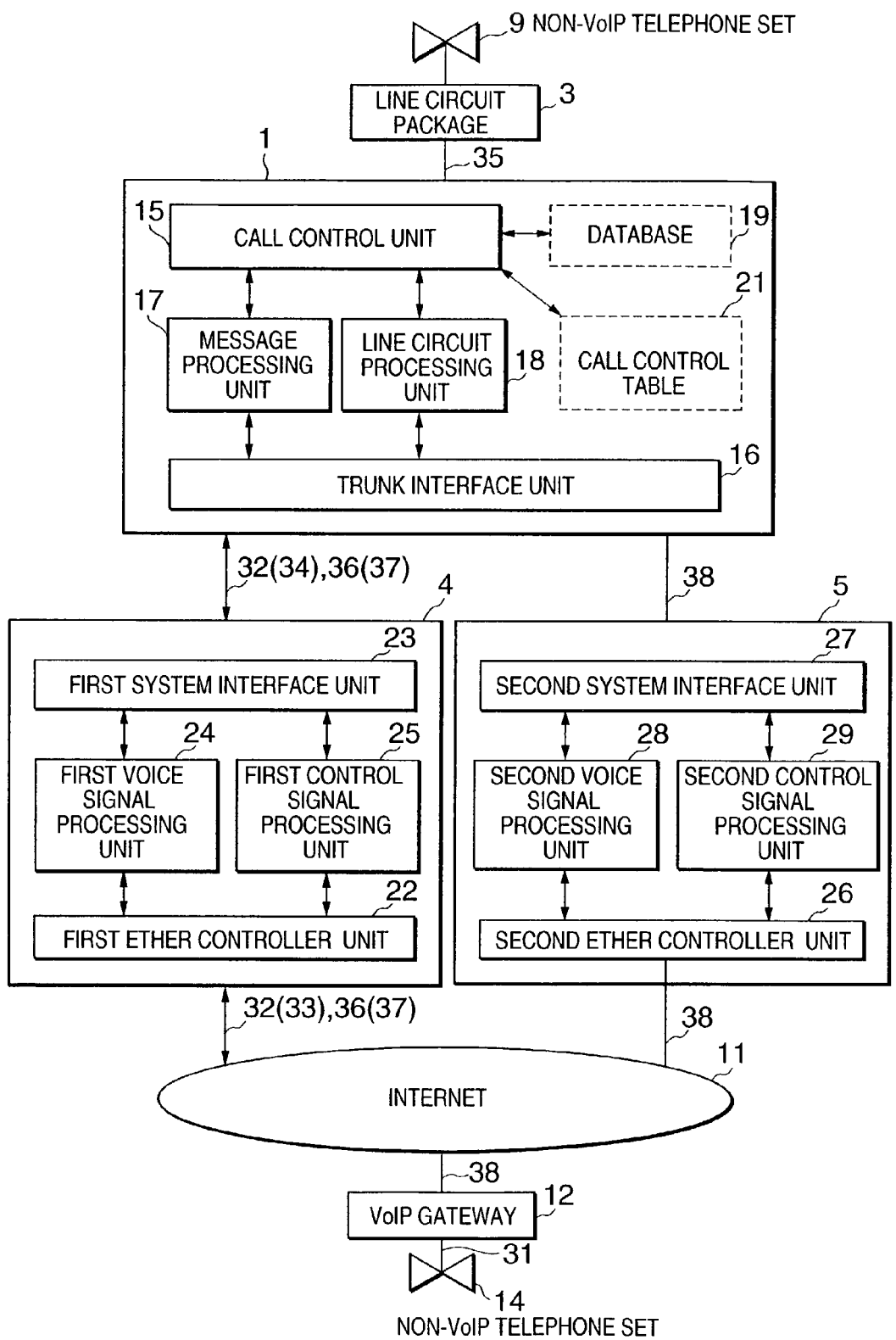
FIG. 2 illustrates in detail the configurations of the switchboard and the VoIP trunk packages in FIG. 1.

FIG. 2 illustrates in detail the configurations of the switchboard 1 and the plurality of VoIP trunk packages 4 and 5. Herein, out of the VoIP trunk packages 4, 5 and 6 in FIG. 1, the first VoIP trunk package 4 and the second VoIP trunk package 5 are shown as representative of all.

The switchboard 1 is provided with a call control unit 15 together with a trunk interface unit 16. Between the call control unit 15 and the trunk interface unit 16, there are installed a message processing unit 17 and a line circuit processing unit 18 in parallel to each other and in such a way that signals can be exchanged in two ways. The switchboard 1 is further provided with a database 19 and a call control table 21. The database 19 and the call control table 21 are also connected to be able to exchange signals in both ways to and from the call control unit 15.

The first VoIP trunk package 4 is provided with a first Ether controller unit 22 and a first system interface unit 23. Between the first Ether controller unit 22 and the first system interface unit 23, there are installed a first voice signal processing unit 24 and a first control signal processing unit 25 in parallel to each other and in such a way that signals can be exchanged in both ways. The voice processing function of the first voice signal processing unit 24 is independent of the control signal processing function of the first control signal processing unit 25. The second VoIP trunk package 5 is provided with a second Ether controller unit 26 and a second system interface unit 27. Between the second Ether controller unit 26 and the second system interface unit 27, there are installed a second voice signal processing unit 28 and a second control signal processing unit 29 in parallel to each other and in such a way that signals can be exchanged in both ways. The voice processing function of the second voice signal processing unit 28 is independent of the control signal processing function of the second control signal processing unit 29.

The call control unit 15 of the switchboard 1 transmits and receives information to and from the first Ether controller unit 22 via the trunk interface unit 16 and the first system interface unit 23. The call control unit 15 also transmits and receives information to and from the second Ether controller unit 26 via the trunk interface unit 16 and the second system interface unit 27.

The first VoIP trunk package 4, using the first Ether controller unit 22, transmits IP packets to and from the Internet 11. The second VoIP trunk package 5, using the second Ether controller unit 26, also transmits IP packets to and from the Internet 11. The first voice signal processing unit 24, by managing a plurality of voice ports (not shown) within the first Ether controller unit 22 communicating with the Internet 11, executes control over a plurality of voice channels within the first VoIP trunk package 4. The first voice signal processing unit 24 converts voice into an IP packet and vice versa.

The first control signal processing unit 25 manages call control signals and, by converting the call control signals into packets, makes possible two-way transmission and reception of the control signals between the first VoIP trunk package 4 and the Internet 11. The second control signal processing unit 29 also manages call control and, by converting the call control signals into packets, makes possible two-way transmission and reception of the control signals between the second VoIP trunk package 5 and the Internet 11.

The first voice signal processing unit 24, receiving instructions from the switchboard 1, operates independent of the first control signal processing unit 25. The second voice signal processing unit 28, too, receiving instructions from the switchboard 1, operates independent of the second control signal processing unit 29.

The message processing unit 17 of the switchboard 1 executes analysis of call control signals generated by the call control unit 15 and assembly of call control signals. The line circuit processing unit 18, receiving an instruction from the call control unit 15, controls voice channel selection and controls the selected voice channel. The call control unit 15, referencing the database 19, manages and controls the call connecting function of the switchboard 1 by preparing a call control table 21 for each call.

Next will be described processing of voice channel selection in the call control unit 15, referencing data in the database 19.

The database 19 has a PKG number management table 41 shown in FIG. 3, a group number management table 42 shown in FIG. 4, a channel number management table 43 shown in FIG. 5, and a channel state management table 44 shown in FIG. 6.

The PKG number management table 41 contains matching information regarding how the package number (PKG number) of each package in the package groups including the VoIP trunk packages 4, 5 and 6 matches its mounting position (accommodating position). For instance a package having a PKG number "2" is mounted in a mounting position "B". The call control unit 15 of the switchboard 1, on the basis of the PKG number management table 41, identifies and derives the PKG number of the first VoIP trunk package 4. A PKG number identified in this manner will be hereinafter referred to as an identified PKG number.

The group number management table 42 contains matching information regarding how a PKG number matches a group number for distinguishing a group, which is a sub-group of a package group. The call control unit 15, on the basis of the group number management table 42, identifies and derives the group number matching the identified PKG number. A group number identified in this manner will be hereinafter referred to as an identified group number.

The channel number management table 43 contains matching information regarding how a group number matches a channel number. The call control unit 15, on the basis of the channel number management table 43, identifies and derives a channel number group matching a specific group number. A channel number group identified in this manner will be hereinafter referred to as an identified channel number group.

The channel state management table 44 contains matching information regarding how every channel number matches the state of that channel. The state of a channel is expressed in a binary digit, indicating either an unoccupied state or an occupied state. The call control unit 15, on the basis of the channel state management table 44, selects a voice channel which is in an unoccupied state out of an identified channel number group. A voice channel selected and identified in this manner will be hereinafter referred to as an identified voice channel.

The database 19 further has a PKG information table 45 shown in FIG. 7. The PKG information table 45 contains matching information regarding how a PKG number, a channel number, the IP address of that package, and the port number of that package match one another. The call control unit 15, on the basis of the PKG information table 45, identifies and derives an IP address and a port number matching an identified channel number. An IP address and a port number identified in this manner will be hereinafter referred to as an identified IP address and an identified port number.

Supposing here, for instance, that the PKG number of the first VoIP trunk package 4 is "1" and the PKG number of the second VoIP trunk package 5 is "2", the group number of the group to which these two kinds of packages belong will be identified to be "10" on the basis of the group number management table 42. Then, on the basis of the channel number management table 43, the channel state management table 44 and the PKG information table 45, an unoccupied voice channel is selected out of a plurality of voice channels belonging to the group of the group number "10".

First, according to the channel number management table 43, the reference numbers of voice channels belonging to this group number "10" are identified to be "1" through "20". Next, according to the channel state management table 44, the reference numbers of unoccupied voice channels out of the channel numbers "1" through "20" are identified to be "7" through "10". Then, according to the PKG information table 45, the PKG number of the VoIP trunk package into which voice channels of channel numbers "7" through "10" are accommodated is identified to be "2".

From the foregoing sequence of specification, the call control unit 15 knows that unoccupied voice channels (channel numbers "7" through "10") are present in the second VoIP trunk package 5 having the PKG number "2". Then, the call control unit 15 selects the unoccupied voice channel of channel number "7", for instance, out of this plurality of unoccupied voice channels, and forms a voice path.

The call control unit 15 also notifies the channel number "7" of the unoccupied voice channel, that has been selected, to the second voice signal processing unit 28 of the second VoIP trunk package 5 via the line circuit processing unit 18 and the second system interface unit 27.

Further, the call control unit 15 notifies already received voice channel information 33 (corresponding to an IP address and a port number in the PKG information table 45) to the second voice signal processing unit 28 via the line circuit processing unit 18, the trunk interface unit 16 and the second system interface unit 27. The second voice signal processing unit 28 opens in the second VoIP trunk package 5 an identified port (not shown) within the second Ether controller unit 26. This identified port has an identified port number matching an identified voice channel(ex. channel number is "7").

The second VoIP trunk package 5 receives a voice packet from the VoIP gateway 12 via this opened identified port, and starts transmitting it to the line circuit package 3. The second VoIP trunk package 5 also receives a voice packet from the line circuit package 3, and starts transmitting it to the VoIP gateway 12.

Also the call control unit 15, on the basis of the PKG information table 45, derives an identified PKG number to which an identified voice channel belongs, and prepares a call control table 46 shown in FIG. 8. The call control table 46 is prepared as a table containing matching information regarding how a call number, the PKG number of the first VoIP trunk package 4 to which the first control signal processing unit 25 currently in use belongs, the PKG number of the second VoIP trunk package 5 to which the second voice signal processing unit 28 currently in use belongs, and an identified channel number of the identified voice channel of the second VoIP trunk package 5 currently in use match one another. This call control table 46 shows matching relationship of the PKG number between the control signal processing unit and voice signal processing unit.

Supposing here, the call control unit 15, on the basis of voice channel information 37 in the PKG information table 45 containing an IP address matching an identified PKG number and an identified channel number and an identified port number, prepares a response signal 36. The call control unit 15, referencing the call control table 46 already prepared, identifies the first control signal processing unit 25 currently in use, and forwards the response signal 36 to the first VoIP trunk package 4. The response signal 36 received by the first system interface unit 23 of the first VoIP trunk package 4 is transmitted to the Internet 11 via signal link connection established by the first control signal processing unit 25, and forwarded to the VoIP gateway 12.

The VoIP gateway 12 converts voice information received from the telephone set 14 into a packet, and transmits the resultant voice packet to an identified port bearing an identified IP address and an identified port number within the second VoIP trunk package 5. For instance, when the unoccupied voice channel of channel number "7" is selected, the identified IP address is "1.1.1.2" and the identified port number is "1006", according to the PKG information table 45.

The switchboard 1, using the first control signal processing unit 25 of the first VoIP trunk package 4 and the second voice signal processing unit 28 of the second VoIP trunk package 5, forms a call path between the telephone set 14 and the telephone set 9. It is thereby made possible to process call control signals within the first VoIP trunk package and voice signals within the second VoIP trunk package and thereby to efficiently utilize unoccupied voice channels in the second VoIP trunk package.

Figure 9:
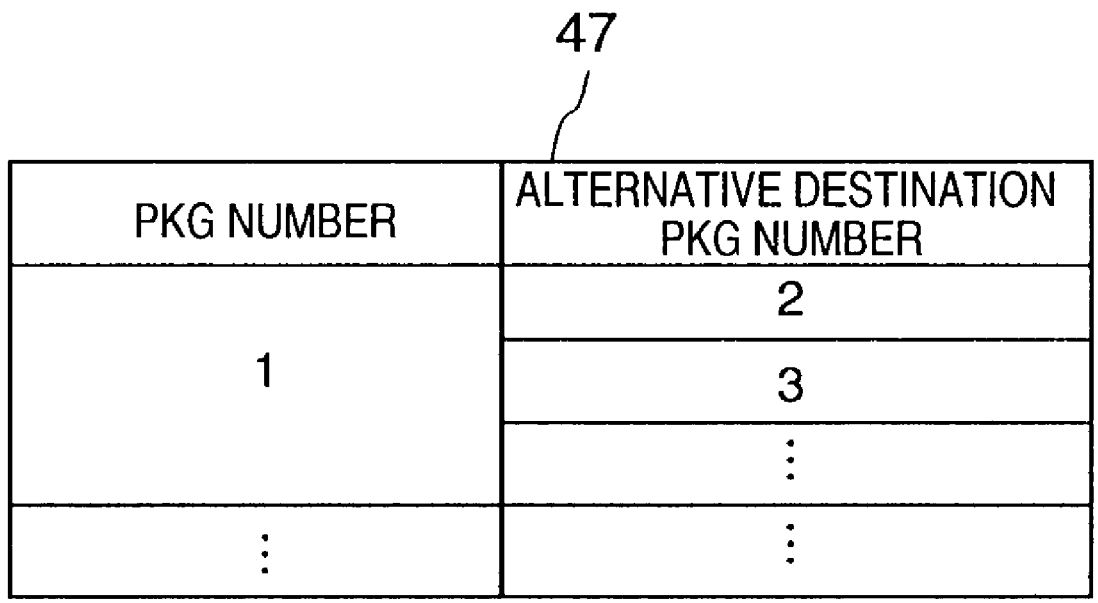

Further the database 19 has an alternative destination table 47 shown in FIG. 9. The alternative destination table 47 contains matching information regarding how the PKG number (for instance "1") of the first VoIP trunk package 4, which receives a call initiation signal 32, matches the PKG number of the alternative destination package of that package 4. If the first VoIP trunk package 4 does not use the first voice signal processing unit 24, an alternative destination package other than the first VoIP trunk package 4 (whose PKG number is not "1") will be selected.

There are a plurality of candidate packages for such an alternative destination, which are defined by the alternative destination table 47. By selecting such a package to be chosen out of a subgroup, concentration of alternative destination packages can be avoided.

In the following paragraphs, the operation to form voice communication paths by dialing the subscriber number of the telephone set 9 on the telephone set 14 will be described in detail.

First, when the subscriber number of the telephone set 9 is dialed on the telephone set 14, the VoIP gateway 12 recognizes on the basis of that telephone number the start of voice communication via the Internet 11. Having recognized the start of voice communication, the VoIP gateway 12 selects voice channel to be used in the VoIP, and forms a first call path 31 between the VoIP gateway 12 and the telephone set 14 out of that voice channel.

The VoIP gateway 12, on the basis of the subscriber number of the telephone set 9, derives the IP address of the first VoIP trunk package 4, for instance, which is to be the destination of the call and, as shown in FIG. 2, transmits the call initiation signal 32 to the first VoIP trunk package 4 via the Internet 11. The call initiation signal 32 contains the voice channel information 33 to be used by the VoIP gateway 12. The voice channel information 33 is formed of an IP address and a port number.

Having received the call initiation signal 32, the first VoIP trunk package 4 establishes signal link connection to the VoIP gateway 12, and forwards that call initiation signal 32 to the switchboard 1 as a call arrival signal 34 indicating the reception of the call initiation signal 32.

The trunk interface unit 16 within the switchboard 1 recognizes the call arrival signal 34 to be the call initiation signal 32, which is a call control signal, and the message processing unit 17 takes out the telephone number and the IP address and the port number, which constitute the voice channel information 33 on the VoIP gateway 12. The telephone number and the IP address and the port number of the VoIP gateway 12, which have been taken out, are notified by the message processing unit 17 to the call control unit 15. The call control unit 15 selects the unoccupied voice channel to be used in the VoIP. A case in which an unoccupied voice channel within the second VoIP trunk package 5 is selected as that unoccupied voice channel. This state, for instance, is that all voice channels within the first VoIP trunk package 4 are occupied.

The switchboard 1 connects the VoIP gateway 12 and the line circuit package 3 via the second VoIP trunk package 5 in which there is the selected unoccupied channel, and further forms a second call path 32 between the switchboard 1 and the line circuit package 3.

On the selected voice channel (ex. channel number is "7") within the second VoIP trunk package 5, the response signal 36 is prepared by the line circuit processing unit 18 on the basis of the IP address(ex. "1.1.1.2") and the port number (ex. "1006") contained in the PKG information table 45. For the communication of the response signal 36 here, the signal link connection of the first VoIP trunk package 4 having detected the call arrival signal 34 is used. Thus, the response signal 36 is notified to the VoIP gateway 12 via the first control signal processing unit 25 of the first VoIP trunk package 4 and the Internet 11. The transmission of the response signal 36 to the VoIP gateway 12 results in formation of a third call path 38 between the second VoIP trunk package 5 and the switchboard 1 and the VoIP gateway 12 via the Internet 11. This formation of the first call path 31, the second call path 32 and the third call path 38 makes possible a call between the telephone set 14 and the telephone set 9.

The present invention can provide the following advantages. The switchboard 1 according to the invention, if all the voice channels within the first VoIP trunk package 4 where a call control signal has arrived are occupied and there is no unoccupied channel, path formation using unoccupied voice channels in another trunk package, i.e. the second VoIP trunk package 5, mounted on the switchboard 1 is carried out. Even if there is no unoccupied channel in the first VoIP trunk package 4, it enables the switchboard 1 to avoid running into a busy state. Thus it is made possible for the switchboard 1 to effectively utilize all the mounted voice channels.

Furthermore, it is made unnecessary to set call distribution in a plurality of VoIP trunk packages in the event of call control signal (call initiation signal) arrival or to provide VoIP trunk-dependent design to secure surplus channels to be able to respond to momentarily congested traffic. It is therefore made possible to design a traffic network on the basis of the total of voice channels the switchboard has. It is further made possible to set an upper limit each to the maximum number of channels for use in call initiation and to the maximum number of channels for use in call arrival, and to use voice channels on another VoIP trunk when either upper limit is surpassed.

While this invention has been described with reference to a certain preferred embodiment, it is to be understood that the subject matter encompassed by way of this invention is not limited to this specific embodiment. Instead, it is intended for the subject matter of the invention to include all such alternatives, modifications and equivalents as can be included within the spirit and scope of the following claims.

What is claimed is:

1. A voice channel selection system, comprising:
a plurality of VoIP trunk packages; and
a switchboard, the switchboard comprising
ports for connection, via individual ones of plural VoIP trunk packages, to the Internet,
a call control unit connected operatively to the ports and which, on the basis of an entered call control signal, utilizes the voice signal processing unit of one VoIP trunk package on which any unoccupied voice channel is present out of said plurality of VoIP trunk packages to form a voice communication path from a first voice terminal to a second voice terminal, the formed voice communication path being via the unoccupied voice channel of the one VoIP trunk package and the Internet,
the switchboard connecting said plurality of trunk packages to each other so that the one VoIP trunk package is connected to another VoIP trunk package and the formed voice communication path is from the first voice terminal to the second voice terminal via the unoccupied voice channel of the one VoIP trunk package and a voice channel of the another VoIP trunk package; and
a call control table, wherein said call control table contains information on matching among the call number of said call control signal, the package number of the trunk package to which said signal processing unit for processing said call control signal belongs, the package number of said trunk package on which said unoccupied voice channel is present, and the channel number of said unoccupied voice channel.

2. The voice channel selection system, as claimed in claim 1, wherein:
each of said trunk packages is further provided with a voice signal processing unit for processing voice signals and a control signal processing unit call for processing control signals.

3. The voice channel selection system, as claimed in claim 1, wherein:
each of said plurality of trunk packages has a plurality of voice channels,
said call control unit recognizes a binary state of said plurality of voice channels, said binary state being either occupied state or unoccupied.

4. The voice channel selection system, as claimed in claim 3, wherein:
said switchboard is further provided with a database,
said database is bidirectionally connected to said call control unit and contains a channel state management table, and
said channel state management table holds said binary state.

5. The voice channel selection system, as claimed in claim 1, wherein:
a package group containing said plurality of VoIP trunk packages has a plurality of package subgroups, and
said call control unit selects said unoccupied channel from one of said package subgroups.

6. A voice channel selection system, comprising:
a switchboard for connecting a plurality of VoIP trunk packages to each other,
said switchboard provided with a call control unit which, on the basis of an entered call control signal, utilizes the voice signal processing unit of a trunk package on which any unoccupied voice channel is present out of said plurality of trunk packages to form voice communication paths, wherein,
a package group containing said plurality of VoIP trunk packages has a plurality of package subgroups, and
said call control unit selects said unoccupied channel from one of said package subgroups,
said switchboard is further provided with a database,
said database is bidirectionally connected to said call control unit and contains a group number management table,
said group number management table contains information on matching between group numbers of said package subgroups and package numbers of a plurality of trunk packages belonging to said package subgroups.

7. The voice channel selection system, as claimed in claim 6, wherein:
said database further includes a channel state management table,
said channel state management table holds the binary state of said plurality of voice channels, said binary state being either occupied or unoccupied, and
said call control unit recognizes the binary state of said plurality of voice channels.

8. The voice channel selection system, as claimed in claim 7, wherein:
said database further includes a channel number management table, and
said channel number management table contains information on matching between said group numbers and the channel numbers of said voice channels.

9. The voice channel selection system, as claimed in claim 8, wherein:
said database further includes a package information table, and
said package information table contains information on matching among said package numbers, said channel numbers, IP addresses matching said package numbers, and port numbers matching said channel numbers.

10. The voice channel selection system, as claimed in claim 7, wherein:
said database further includes a package information table, and
said package information table contains information on matching among said package numbers, said channel numbers, IP addresses matching said package numbers, and port numbers matching said channel numbers.

11. The voice channel selection system, as claimed in claim 6, wherein:
said database further includes a package information table, and
said package information table contains information on matching among said package numbers, said channel numbers, IP addresses matching said package numbers, and port numbers matching said channel numbers.

12. A voice channel selection system, comprising:
a plurality of VoIP trunk packages; and
a switchboard for connecting the plurality of VoIP trunk packages to each other, the switchboard comprising
ports for connection, via individual ones of the plural VoIP trunk packages, to the Internet,
a call control unit connected operatively to the ports and which, on the basis of an entered call control signal, utilizes the voice signal processing unit of one VoIP trunk package on which any unoccupied voice channel is present out of said plurality of VoIP trunk packages to form a voice communication path from a first voice terminal to a second voice terminal, the formed voice communication path being via the unoccupied voice channel of the one VoIP trunk package and the Internet,
the switchboard connecting said plurality of VoIP trunk packages to each other so that the one VoIP trunk package is connected to another VoIP trunk package and the formed voice communication path is from the first voice terminal to the second voice terminal via the unoccupied voice channel of the one VoIP trunk package and a voice channel of the another VoIP trunk package, and
an alternative destination table, wherein said alternative destination table contains information on matching between the package number of the trunk package having received said call control signal and a package subgroup defined to be a plurality of candidate packages for such an alternative destination, from which an unoccupied voice channel is to be selected.

13. The voice channel selection system, as claimed in claim 12, wherein:
each of said plurality of trunk packages has a plurality of voice channels,
said call control unit recognizes a binary state of said plurality of voice channels, said binary state being either occupied state or unoccupied.

14. The voice channel selection system, as claimed in claim 12, wherein:
said switchboard is further provided with a database, said database is bidirectionally connected to said call control unit and contains a channel state management table, and said channel state management table holds said binary state.

15. The voice channel selection system, as claimed in claim 12, wherein:

a package group containing said plurality of VoIP trunk packages has a plurality of package subgroups, and said call control unit selects said unoccupied channel from one of said package subgroups.

16. A voice channel selection system in a communications system, comprising:

a plurality of VoIP trunk packages, including a first VoIP trunk package and a second VoIP trunk package for transmitting IP packets to and from the Internet; and a switchboard for connecting said plurality of trunk packages to each other, said first VoIP trunk package being provided with a first voice signal processing unit for processing voice signals into IP packets for transmission to the Internet and having a plurality of voice channels, and a first control signal processing unit for processing control signals notifying that said first voice signal processing unit has an unoccupied voice channel, said second VoIP trunk package being provided with a second voice signal processing unit for processing voice signals into IP packets for transmission to the Internet and having a plurality of voice channels, and a second control signal processing unit for processing control signals notifying that said second voice signal processing unit has an unoccupied voice channel, wherein, the switchboard forms a voice communications path to either i) a voice channel matching the first voice signal processing unit on the basis of said control signal received by said first control signal processing unit indicating that said first voice signal processing unit has an unoccupied voice channel, or ii) a voice channel matching the second voice signal processing unit on the basis of said control signal received by said first control signal processing unit indicating that said second voice signal processing unit has an unoccupied voice channel.

17. A voice channel selection method in a communications system provided with a plurality of VoIP trunk packages and a switchboard for connecting said plurality of VoIP trunk packages to each other, said voice channel selection method, comprising:

a step of receiving call control signals transmitted via said Internet with a control signal processing unit of a first VoIP trunk package within said plurality of trunk packages, a step of selecting a second VoIP trunk package that has an unoccupied voice channel out of a plurality of voice channels, a step of said switchboard forming a voice communication path connecting said first and second VoIP trunk packages by using said unoccupied voice channel of said second VoIP trunk package based on the voice signal processing unit of said second VoIP trunk package indicating that said second VoIP trunk package has an unoccupied voice channel, a step of preparing a channel state management table showing the binary state, in a plurality of voice channels to be accommodated in said plurality of trunk packages, of those voice channels, wherein said binary state is either an unoccupied state or an occupied state, and a step of preparing a channel number management table showing information on matching between the group number of said package subgroups and the plurality of channel numbers of a plurality of voice channels to be accommodated in a trunk package belonging to said package subgroups.

18. A voice channel selection method in a communications system provided with a plurality of VoIP trunk packages and a switchboard for connecting said plurality of VoIP trunk packages to each other, said voice channel, comprising:

a step of receiving call control signals transmitted via said Internet with a control signal processing unit of a first VoIP trunk package within said plurality of trunk packages, a step of selecting a second VoIP trunk package that has an unoccupied voice channel out of a plurality of voice channels, a step of said switchboard forming a voice communication path connecting said first and second VoIP trunk packages by using said unoccupied voice channel of said second VoIP trunk package based on the voice signal processing unit of said second VoIP trunk package indicating that said second VoIP trunk package has an unoccupied voice channel, wherein both said first trunk package and said second trunk package belong to a package subgroup within a package group to which said plurality of trunk packages belong, a step of preparing a channel state management table showing the binary state, in a plurality of voice channels to be accommodated in said plurality of trunk packages, of those voice channels, wherein said binary state is either an unoccupied state or an occupied state, and a step of preparing a channel number management table showing information on matching between the group number of said package subgroups and the plurality of channel numbers of a plurality of voice channels to be accommodated in a trunk package belonging to said package subgroups.

* * * * *